Oct. 17, 1933.  F. A. BRAUCHT  1,931,177
EYEGLASSES OR SPECTACLES
Filed July 21, 1930
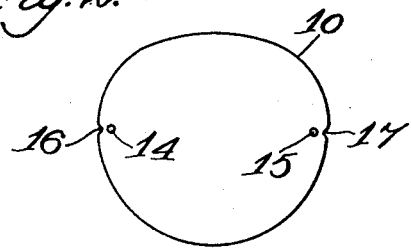
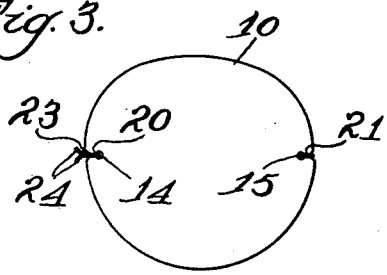
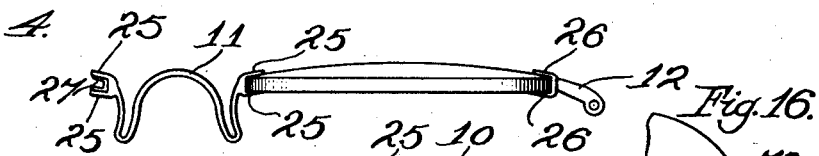
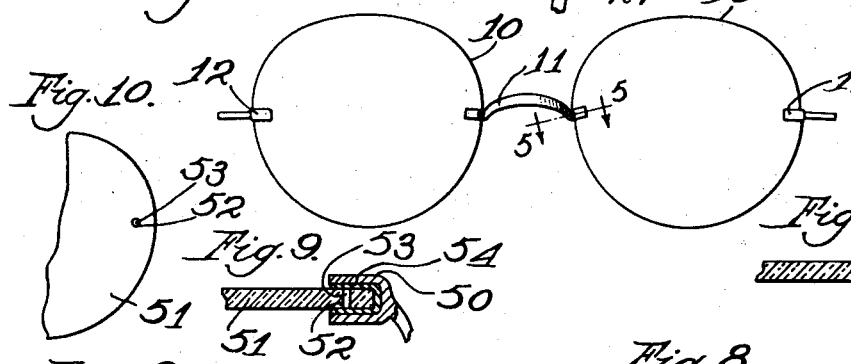
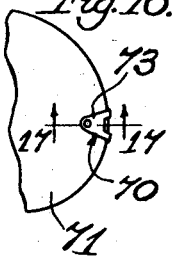
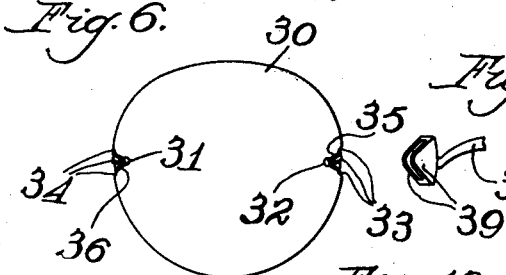
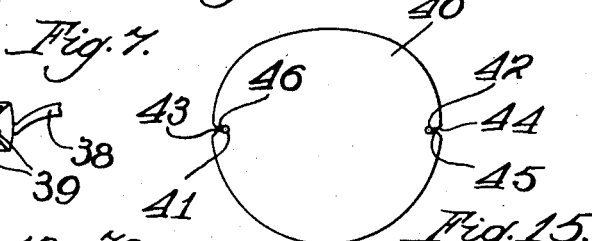
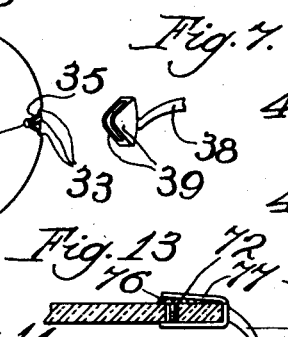
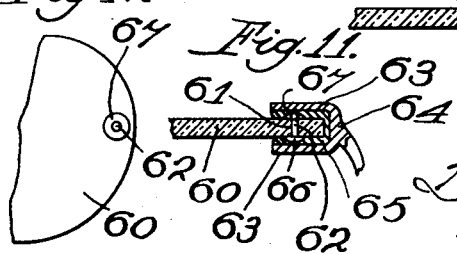
Inventor
Frederick A. Braucht.
By Dyrenforth, Lee, Chritton & Wiles
Attys.

Patented Oct. 17, 1933

1,931,177

UNITED STATES PATENT OFFICE 1,931,177

EYEGLASSES OR SPECTACLES

Frederick A. Braucht, Chicago, Ill., assignor to Belgard-Spero, Inc., Chicago, Ill., a corporation of Delaware Application July 21, 1930. Serial No. 469,538

7 Claims. (Cl. 88—47)

The invention relates to eye glasses or spectacles, and particularly to a method of and construction for fastening the lenses of eye-glasses or spectacles to the bridges and bows thereof.

A particular object of the invention is to provide devices of the kind described, wherein the bridge and bracket members are secured to the lenses by soft solder, as distinguished from "hard" solder, such as "gold solder".

One form of the invention is embodied in spectacles having lenses which have holes drilled therethrough at the points that are to be fastened to the bridge and bows, notches being provided in the edges of the lenses adjacent the drilled holes. Wires are looped through the notches and holes. The bridges and the bracket members to which the bows are pivoted are provided with bifurcated ends which embrace the wire loops and are soldered thereto. In practicing the improved method, the solder is first applied to the bifurcated ends and they are then positioned to straddle the wire loops, after which the solder is fused and capillary attraction between it and the wire causes the solder to flow through the drilled holes.

In another form of the invention, a plurality of wire loops pass through each of the drilled holes and the bifurcated ends are soldered to these wires, and in still another form of the invention, metallic paint is applied to the lenses in lieu of the wire loops.

In still other forms of the invention, wires or metallic parts are inserted in holes drilled in the lenses, the wires or metallic parts being snugly fitted in the holes. The bridge or bracket members are then soldered to the wires or metallic parts. Very little, if any, solder flows into or through the holes in the lenses.

Many other objects and advantages will appear as this description progresses, reference being had to the accompanying drawing, wherein Figure 1 is a front elevation of spectacles embodying the invention.

Fig. 2 is a front elevation of a lens which has been drilled and notched so that it may be secured to the bows and bridge of the spectacles by practicing my improved method.

Fig. 3 is a front elevation of the lens shown in Fig. 2, wire loops being shown passing through the drilled holes.

Fig. 4 is a plan view of the lens connected to a bridge and a bracket member, the bracket member being the part to which the bow is attached.

Fig. 5 is a section taken on line 5—5 of Fig. 1.

Fig. 6 is a front elevation of a lens which embodies another form of the invention.

Fig. 7 is a perspective view of one end of a bridge particularly adapted to be attached to the lens shown in Fig. 6.

Fig. 8 is a front elevation of a lens which embodies still another form of the invention.

Fig. 9 is a fragmentary section taken through a lens and a portion of the bridge secured thereto, another form of the invention being illustrated by this figure.

Fig. 10 is a fragmentary elevation of the lens shown in Fig. 9.

Fig. 11 is a fragmentary section taken through a lens which has a bridge member secured thereto, still another form of the invention being illustrated by this figure, and Fig. 12 is a fragmentary elevation of the lens shown in Fig. 11.

Fig. 13 is a fragmentary section through a lens having a bridge attached thereto by means embodying another form of the invention.

Fig. 14 is a fragmentary elevation of the bridge shown in Fig. 13.

Fig. 15 is an end view of the lens showing a bifurcated member attached thereto, the bifurcated member being adapted to have the bridge soldered thereto.

Fig. 16 is a fragmentary elevation of the lens, the bifurcated member shown in connection therewith, and Fig. 17 is an enlarged section taken on line 17—17 of Fig. 16.

Referring for the present to Figs. 1 to 5, inclusive, wherein I have illustrated a preferred form of the invention, I have shown a pair of spectacles comprising lenses 10 joined by a bridge 11 and provided with bracket members 12 to which the bows (not shown) may be pivoted in accordance with the usual practice.

As best shown in Figs. 2 and 3, each lens 10 is provided with drilled holes 14 and 15 and notches 16 and 17, the notches 16 and 17 being formed in the edge of the lens adjacent the drilled holes 14 and 15, respectively. Wires 20 and 21 are then looped through the notches and drilled holes, as illustrated in Fig. 3. Thus, I have shown the wire 20 looped through the notch 16 and the drilled hole 14 and twisted as at 23 to secure the wire firmly in place. The ends 24 of the wire are then clipped off so that the wire loop 20 will have the appearance of the wire loop 21, shown in Fig. 3, which wire loop 21 is preferably formed in the same manner as the wire loop 20.

Referring to Fig. 4, it will be noted that the ends of the bridge 11 provide bifurcations 25 adapted to straddle the wire loop 20 and that the bracket member 12 is provided with bifurcations 26 adapted to straddle the wire loop 21. In practicing the invention, solder 27, or the equivalent, is applied to the bifurcations 25 and 26 before the lens is assembled therewith. Then when the lens is assembled with the bracket member 12 and the bridge 11, heat is applied by using an alcohol flame, or the equivalent, to fuse the solder whereupon it adheres to the wire loops and also passes through the drilled holes 14 and 15, the solder being drawn through the drilled holes by the capillary attraction between it and the wire (Fig. 5).

The solder employed in the preferred embodiment of the invention is soft solder as distinguished from "gold solder", or the equivalent, which is commonly called hard solder by the trade. Unless otherwise indicated the appended claims should be construed in this manner.

In Fig. 6, I have shown a lens 30 provided with drilled holes 31 and 32. A plurality of notches 33 are cut in the edge of the lens 30 in close proximity to the hole 32, and a plurality of notches 34 are cut in the edge of the lens 30 in close proximity to the hole 31. A plurality of wire loops 35 are provided, each loop 35 passing through the hole 32 and one of the notches 33. Wire loops 36 of similar construction are provided for the hole 31 and the notches 34. The wire loops 35 and 36 are preferably formed in substantially the same manner as the wire loops 20 and 21 described above. In Fig. 7, I have shown a bridge 38 provided with triangular bifurcations 39 adapted to straddle the wire loops 35. In practicing the invention, solder is first applied to the inner surfaces of the bifurcations 39 whereupon they are positioned to embrace the wire loops 35. The solder is then subjected to heat until it fuses, whereupon it is drawn through the hole 32. Of course, a bracket member (not shown) is provided and is attached to the wire loops 36 in the same manner.

In Fig. 8, I have shown a lens 40 provided with drilled holes 41 and 42. Notches 43 and 44 are formed in the edge of the lens 40 adjacent the holes 41 and 42, respectively. Metallic paint is applied to the lens in such manner that a loop 45 thereof extends through the holes 42 and the notch 44 and a loop 46 thereof extends through the hole 41 and the notch 43. The loops 45 and 46 of metallic paint have the same function as the wire loops 20, 21, 35 and 36 described above, and the bridge 11 and the bracket member 12 may be secured thereto in the same manner as they may be secured to the wires 20 and 21 so that the solder extends through the drilled holes 41 and 42.

Figs. 9 and 10 illustrate another form of the invention wherein a bridge member 50 is secured to a lens 51 provided with a drilled hole 52. Fitting snugly in the drilled hole 52 is a short length of wire 53, the length of the wire 53 being preferably substantially equal to the thickness of the lens 51. The bridge member 50 is soldered to the wire 53, as illustrated in Fig. 9. The solder is identified by the reference character 54. In the preferred embodiment of this form of the invention, the solder does not pass through the holes 52.

I have illustrated still another form of the invention in Figs. 11 and 12, wherein 60 is a lens provided with a drilled hole 61 in which a rivet-like member 62 fits snugly. The bifurcations 63 of a bridge 64 are secured to the rivet-like member by solder. It will be noted that the rivet-like member 61 comprises an integral head 66 and that the other end of the member projects through the lens 60. The latter end may be riveted over, but is preferably screw-threaded to receive a rounded head 67. It will be noted that the bifurcations 63 are soldered to the rounded heads 66 and 67. Obviously, very little, if any, solder flows into the holes 61.

Another form of the invention is illustrated in Figs. 13 to 17, inclusive. As best shown in Figs. 15, 16 and 17, a metallic clip or bifurcated metallic member 70 is secured to a lens 71 by a screw 72. The metallic member preferably comprises a substantially flat portion 73 contacting with the back surface of the lens 71 and bifurcations or spaced lugs 74 which engage the edge of the lens.

Referring to Fig. 13, it will be noted that a bridge 75 is soldered to the head of the screw 72 and to the lugs or bifurcations 74, the solder being indicated at 76. For this purpose, the bridge 75 is provided with an extension 77 engageable with the head of the screw 72 and the bridge is also provided with a portion 78 adapted to fit between the lugs 74 and to be soldered thereto.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I claim as new, and desire to secure by Letters Patent, is:

1. Eye-glasses or spectacles comprising lenses having notches in their edges and having holes formed spaced from said edges, loops formed of wire attached to said lenses and extending through said holes and said notches, and metallic parts soldered to said loops, said wire having a fusing point higher than said solder.

2. Eye-glasses or spectacles comprising lenses having holes formed therein spaced from the edges thereof and having notches in their edges, metallic elements secured to said lenses and extending through said notches and said holes, and metallic parts soldered to said metallic elements.

3. Eye-glasses or spectacles comprising lenses having holes formed therein, elements formed of metallic paint extending through said holes, and metallic parts secured to said lenses by solder adhering to said metallic paint and extending through said holes.

4. Means for mounting a lens having a hole formed therethrough and spaced from its edge, said means comprising a metallic member passing through said hole and secured directly to said lens, a bifurcated member having its bifurcations straddling said metallic member, and soft solder securing said bifurcations to said metallic member, said solder having a lower fusing point than said metallic member and said bifurcated member, and said solder being the sole means for securing said bifurcations to said metallic member.

5. Means for mounting a lens having a hole therethrough spaced from its edge, said means comprising a metallic member disposed in said hole and being of a length approximately equal to the thickness of the lens, a bifurcated member having bifurcations straddling said metallic member, and solder securing said bifurcations to said metallic member, said solder having a lower fusing point than said metallic member and said bifurcated member and said solder being the sole means for securing said bifurcations to said metallic member.

6. Means for mounting a lens having a hole therethrough spaced from its edge, said means comprising a metallic member disposed in said hole and being of a length approximately equal to the thickness of the lens, a bifurcated member having its bifurcations straddling said metallic member, and solder securing said bifurcations to said metallic member and extending through said hole, said solder having a lower fusing point than said metallic member and said bifurcated member and said solder being the sole means for securing said bifurcations to said metallic member.

7. Eyeglasses or spectacles comprising a lens having a hole formed therein spaced from its periphery, a metallic member having spaced lugs engaging the periphery of the lens, a metallic pin passing through said hole and having a head engaging the lens on one side of the hole and having its other end secured to said metallic member, and a bracket member soldered to said pin and to said metallic member.

FREDERICK A. BRAUCHT.